W. Van Anden.
Mower
№ 19803  Patented Mar. 30, 1858.

W. Van Anden.
Mower.
No. 19803. Patented Mar. 30, 1858.

UNITED STATES PATENT OFFICE.

WM. VAN ANDEN, OF POUGHKEEPSIE, NEW YORK.

IMPROVEMENT IN HARVESTERS.

Specification forming part of Letters Patent No. 19,803, dated March 30, 1858.

*To all whom it may concern:*

Be it known that I, WILLIAM VAN ANDEN, of Poughkeepsie, Dutchess county, State of New York, have invented certain new and useful improvements in machinery for cutting grass, grain, and other similar substances; and I do hereby declare the following to be a full description of the same.

The nature of my invention consists in the application and use of a spring or springs, (if more than one is used,) in combination with a detent-cam, for the purpose of actuating the cutter of a harvesting-machine backward and forward through the grass, &c., by a sudden or impulsive movement, and thereby sever the same more certainly to prevent choking the machine, as is commonly the case where the cutters are vibrated by a crank motion; also, in the use of a double-acting cam as arranged and constructed and used upon a crank-shaft for the purpose of giving two vibrations—that is, one back and one forward—to the spring, to one revolution of the cam-wheel, for the purpose of giving the alternating motion to the cutters; also, in the mode of combining the spring with the cam-shaft, crank, and lever attached to the cutters, for the purpose of operating the same; and, lastly, in the use of a spring, cam, and cam-shaft in combination with the cutters of a grass or grain harvester machine.

But to describe my invention more particularly, I will refer to the accompanying drawings, forming a part of this specification, the same letters of reference, wherever they occur, referring to like parts.

Figure 1:
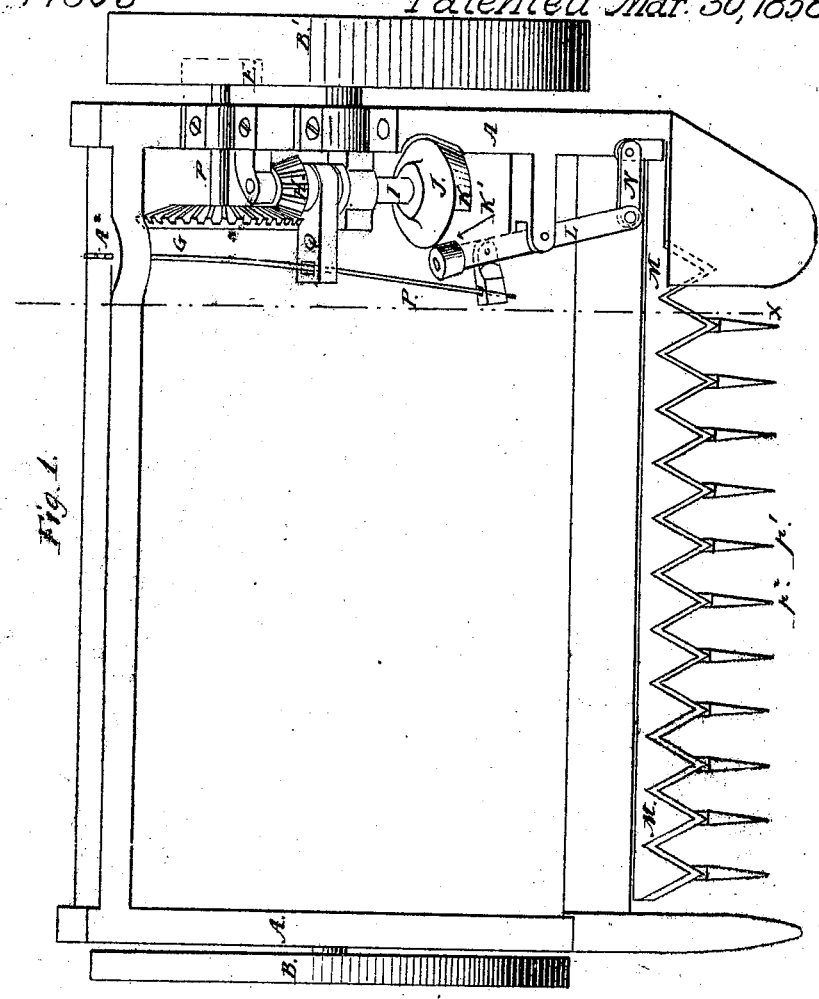
Figure 2:
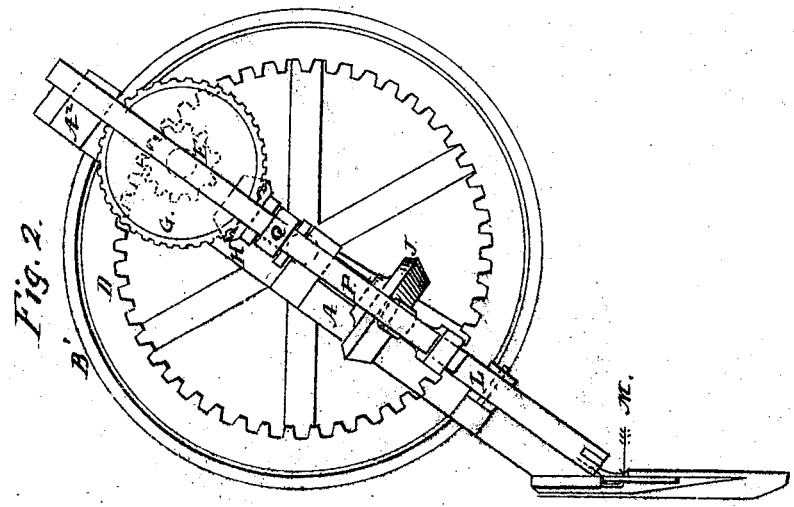
Figure 4:
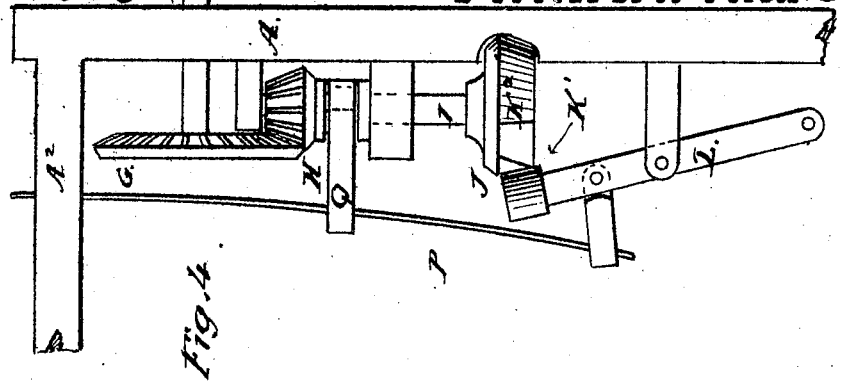
Figure 3:
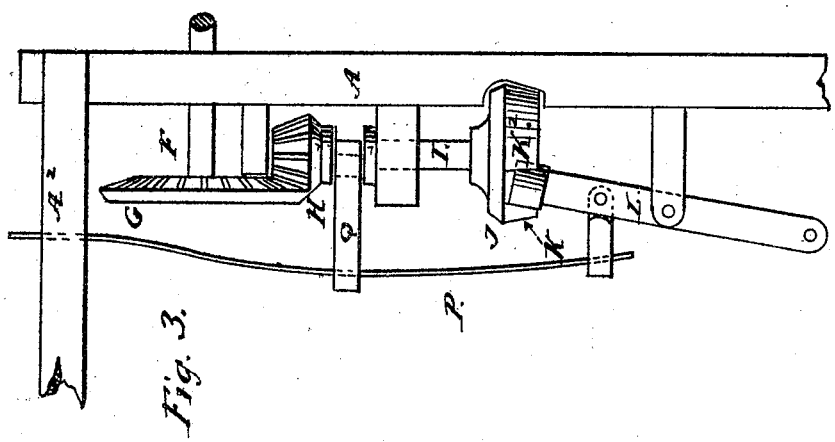
Figure 5:
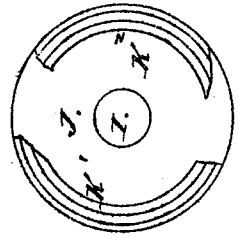
Figure 6:
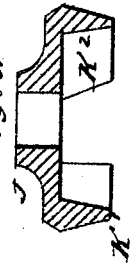

Figure 1 is a plan view of the machine. Fig. 2 is a vertical cut section of the same through the line $x\,x$, Fig. 1. Figs. 3 and 4 are detached plan views of the cam and crank-shaft, exhibiting the opposite curvatures of the spring and position of lever as operated by the cam to project the cutter in opposite directions. Figs. 5 and 6 are front and cut sections of the cam.

Letter A is the frame of the machine, and B and B' are the propelling-wheels thereof. On the inner circumference of the wheel B' is a cog-wheel, D, arranged as a driving-wheel for the operating parts of the machine as it is being propelled over the ground. Into this cog-wheel gears a small cog-wheel, E, secured upon the outer end of a shaft, F. This shaft is arranged at right angles to the driving-wheel, and secured by suitable boxes to the frame A, near its back end. Upon its inner end is a bevel cog-wheel, G. Into this cog-wheel gears a small bevel cog-wheel, H, on the end of a crank-shaft, I, having secured upon its lower end a face cam-wheel, J. On the face of this cam-wheel are the segments of a circular rim, forming thereby cams or guides K' and $K^2$. These cams or guides are opposite to each other and of equal proportions, and having between their opposing ends a certain given space. The object of this is to cause the roller end of the vibrating lever L (for operating the cutter M by means of the link N, connecting the lever L and cutter M together) to act alternately upon the inner and outer surfaces of the cams or guides K' and $K^2$ at each half-revolution of the crank-shaft I. Thus, as shown by the position of the cam-wheel J, Figs. 1 and 4, the roller end of the vibrating lever L operates upon the outer surface of the cam or guide K' in opposition to the throw of the crank I, and thereby bows the lower end of a spring, P, (secured by its back end to the back rail of the frame $A^2$,) out toward the middle of the machine, while the middle of the spring, attached to the crank-rod Q, is bowed in an opposite direction, so that as the end of the vibrating lever L slips off the outer surface of the cam or guide K' into the space between the ends of the guides K' and $K^2$ the spring reacts and causes the cutter to vibrate to the left over the space between the fingers $p'\,p^2$ to sever the intervening stalks of grass or grain; and when the cam-wheel J is in the position shown in Fig. 3 the end of the vibrating lever L has passed in the space between the guides K' and $K^2$, and is operated upon by the inner surface of the guide $K^2$. This causes the end of the spring P to be bowed in toward the side rail of the frame A, while the middle of it is bowed out toward the middle of the machine till the end of the vibrating lever L slips from off the inner point of the guide $K^2$ through the space between the ends of the guides K' and $K^2$ and allows the spring to vibrate the cutters to the right over an equal distance, as before described, and thereby at each revolution of the cam-wheel gives two strokes or vibrations to the cutters.

Having now described my invention and its construction and operation, I will proceed to set forth what I claim and desire to secure by Letters Patent of the United States—

1. The use of a rectilinear spring, in combination with the detent-cam J, having guides K' and K² on the face thereof, for the purpose of actuating the cutter of a harvester-machine endwise in opposite direction from a state of rest by the impulsive stroke of the spring, which said spring is charged by its opposite curvatures while the cutter remains at rest, the said parts being made and operated substantially as hereinbefore set forth.

2. The employment and use of the cam-wheel J, having on its face guides K' and K², substantially as set forth, in combination with a crank-shaft, for the purpose of giving two vibrations to the cutter to one revolution of the cam-wheel, substantially as described.

3. The combination of the spring or springs, as may be used, with the cam-wheel, crank-shaft, and vibrating lever attached to the cutter, for the purpose of operating the same, substantially in the manner hereinbefore set forth.

WM. VAN ANDEN.

Witnesses:
ROBT. S. ROWLEY,
CHARLES L. BARRITT.